(12) United States Patent
Mitsuhashi

(10) Patent No.: US 8,149,277 B2
(45) Date of Patent: Apr. 3, 2012

(54) DISPLAY CONTROL DEVICE, DISPLAY SYSTEM, AND TELEVISION SET

(75) Inventor: Setsu Mitsuhashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 599 days.

(21) Appl. No.: 12/308,742

(22) PCT Filed: Jul. 11, 2007

(86) PCT No.: PCT/JP2007/063818
§ 371 (c)(1),
(2), (4) Date: Dec. 23, 2008

(87) PCT Pub. No.: WO2008/007703
PCT Pub. Date: Jan. 17, 2008

(65) Prior Publication Data
US 2009/0284594 A1 Nov. 19, 2009

(30) Foreign Application Priority Data

Jul. 13, 2006 (JP) .................................. 2006-193052

(51) Int. Cl.
*H04N 7/18* (2006.01)
(52) U.S. Cl. ..................... 348/135; 348/581; 348/333.12
(58) Field of Classification Search .................... 345/10, 345/660, 864; 382/103, 14.08; 358/527; 348/61, 135, 581, 333.12
See application file for complete search history.

(56) References Cited

U.S. PATENT DOCUMENTS

| | | | |
|---|---|---|---|
| 5,982,912 A | 11/1999 | Fukui et al. | |
| 2003/0095155 A1* | 5/2003 | Johnson | 345/864 |
| 2003/0156304 A1* | 8/2003 | Fedorovskaya et al. | 358/527 |
| 2003/0234799 A1* | 12/2003 | Lee | 345/660 |
| 2004/0160386 A1* | 8/2004 | Michelitsch et al. | 345/10 |
| 2004/0196359 A1* | 10/2004 | Blackham | 348/14.08 |
| 2005/0243212 A1 | 11/2005 | Onomatsu et al. | |
| 2005/0270368 A1* | 12/2005 | Hashimoto | 348/61 |
| 2006/0126894 A1* | 6/2006 | Mori | 382/103 |

FOREIGN PATENT DOCUMENTS

| | | |
|---|---|---|
| JP | A-5-3413 | 1/1993 |
| JP | A-9-55926 | 2/1997 |
| JP | A-9-251534 | 9/1997 |
| JP | A-2000-175117 | 6/2000 |
| JP | A-2003-58101 | 2/2003 |
| JP | A-2003-140630 | 5/2003 |
| JP | A-2004-185007 | 7/2004 |
| JP | A-2005-318142 | 11/2005 |

* cited by examiner

*Primary Examiner* — Jungwon Chang
(74) *Attorney, Agent, or Firm* — Oliff & Berridge, PLC

(57) ABSTRACT

A display control device includes: a signal supply unit that supplies an image signal to a display device; and a magnification change control unit that processes the image signal so as to change a magnification of a replay image according to a distance between a person who is observing the replay image upon the display device, and the replay image.

16 Claims, 12 Drawing Sheets

FIG.9

CPU101

VARIANT EMBODIMENT #1

VARIANT EMBODIMENT #2

VARIANT EMBODIMENT #3

FIG.10

CPU101

VARIANT EMBODIMENT #4

VARIANT EMBODIMENT #5

VARIANT EMBODIMENT #6

VARIANT EMBODIMENT #7

DISPLAY CONTROL DEVICE, DISPLAY SYSTEM, AND TELEVISION SET

TECHNICAL FIELD

The present invention relates to a display control device, to a display system, and to a television set.

BACKGROUND ART

A television receiver is known that recognizes the user, and that tunes a program upon a channel preferred by the user according to the result of recognition of the user and according to program information that is inputted in advance (for example, refer to Patent Document #1).

Patent Document #1: Japanese Laid-Open Patent Publication 2000-175117.

Disclosure of the Invention

Problems to be Solved by the Invention

With a display according to a prior art technique, there has been the problem that it has been difficult for a user who is far away to see it.

Means for Solving the Problems

According to the 1st aspect of the present invention, a display control device comprises: a signal supply unit that supplies an image signal to a display device; and a magnification change control unit that processes the image signal so as to change a magnification of a replay image according to a distance between a person who is observing the replay image upon the display device, and the replay image.

According to the 2nd aspect of the present invention, a display control device comprises: a signal supply unit that supplies an image signal and an audio signal to a display device that has an audio replay unit; and an audio control unit that changes a volume of audio replayed by the audio replay unit according to a distance between a person who is observing a replay image upon the display device, and the replay image.

According to the 3rd aspect of the present invention, in the display control device according to the 1st aspect, it is preferred that the magnification change control unit performs magnification or reduction of images, characters, or marks.

According to the 4th aspect of the present invention, in the display control device according to the 1st or the 3rd aspect, it is preferred that the magnification change control unit processes the image signal so that a replay image, which is magnified according to distance information commanded in advance, is displayed by the display device.

According to the 5th aspect of the present invention, in the display control device according to the 1st or the 3rd aspect, it is preferred that: the display control device further comprises a reception unit that receives information from a camera that photographs a person observing the replay image; and the magnification change control unit processes the image signal so that a replay image, which is magnified according to a distance specified by information received by the reception unit from the camera, is displayed by the display device.

According to the 6th aspect of the present invention, in the display control device according to the 5th aspect, it is preferred that: the information from the camera includes a plurality of items of distance information specifying distances between a plurality of persons who are observing the replay image, and the replay image; and the magnification change control unit processes the image signal so that a replay image, which is magnified according to a distance that is most remote among the plurality of distances, is displayed by the display device.

According to the 7th aspect of the present invention, in the display control device according to the 5th aspect, it is preferred that: the information from the camera includes a plurality of items of distance information specifying distances between a plurality of persons who are observing the replay image, and the replay image; and the magnification change control unit processes the image signal so that a replay image, which is magnified according to a distance that is closest among the plurality of distances, is displayed by the display device.

According to the 8th aspect of the present invention, in the display control device according to the 5th aspect, it is preferred that: the information from the camera includes a plurality of items of distance information specifying distances between a plurality of persons who are observing the replay image, and the replay image; and the magnification change control unit processes the image signal so that a replay image, which is magnified according to an average of the plurality of distances, is displayed by the display device.

According to the 9th aspect of the present invention, in the display control device according to the 5th aspect, it is preferred that: the information from the camera includes a plurality of items of distance information specifying distances between a plurality of persons who are observing the replay image, and the replay image, and an image photographed by the camera; there is further provided a user recognition unit that detects face information from the photographed image that is received and performs recognition processing; and the magnification change control unit processes the image signal so that a replay image, which is magnified according to a distance between a person who is recognized by the user recognition unit, and the replay image, is displayed by the display device.

According to the 10th aspect of the present invention, in the display control device according to the 5th aspect, it is preferred that: the information from the camera includes a plurality of items of distance information specifying distances between a plurality of persons who are observing the replay image, and the replay image, and an image photographed by the camera; there is further provided a user recognition unit that detects face information from the photographed image that is received and performs recognition processing; and the magnification change control unit processes the image signal so that a replay image, which is magnified according to a distance between a person who is not recognized by the user recognition unit, and the replay image, is displayed by the display device.

According to the 11th aspect of the present invention, in the display control device according to any one of the 5th through 10th aspects, it is preferred that the magnification change control unit processes the image signal when information is received from the camera by the reception unit.

According to the 12th aspect of the present invention, in the display control device according to any one of the 5th through 10th aspects, it is preferred that the magnification change control unit processes the image signal at timing that contents of the replay image change.

According to the 13th aspect of the present invention, in the display control device according to any one of the 5th through 10th aspects, it is preferred that the magnification change control unit processes the image signal according to a command.

According to the 14th aspect of the present invention, in the display control device according to any one of the 5th through 10th aspects, it is preferred that the magnification change control unit processes the image signal at predetermined intervals.

According to the 15th aspect of the present invention, a display system comprises: a display control device according to anyone of the 1st through 14th aspects; and a display device that displays a replay image according to the image signal.

According to the 16th aspect of the present invention, a television set comprises: a display control device according to any one of the 1st through 14th aspects; a display device that displays a replay image according to the image signal; and a demodulation unit that receives a television broadcast and obtains an image signal.

Advantageous Effect of the Invention

According to the present invention, it is possible to display a replay image in a size that is easy for a user to see.

BRIEF DESCRIPTION OF THE DRAWINGS

FIG. 9 is a functional block diagram showing variant embodiments #1 through #3 for processing by the CPU;

FIG. 10 is a functional block diagram showing variant embodiments #4 through #7 for processing by the CPU;

BEST MODE FOR CARRYING OUT THE INVENTION

Preferred embodiments for implementation of the present invention will now be explained with reference to the drawings.

Embodiment One

Figure 1:
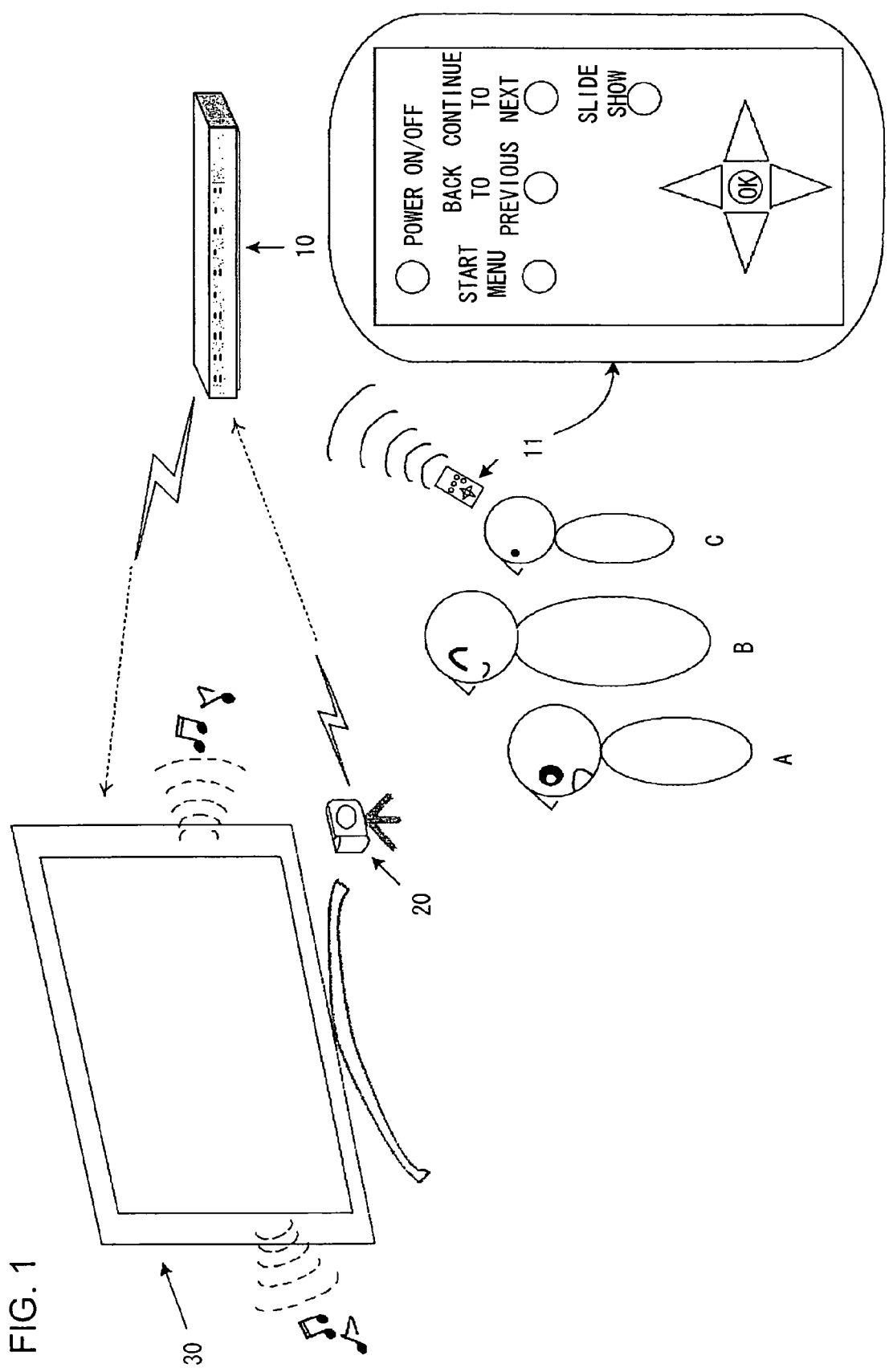
FIG. 1 is a figure showing an example of an information replay system according to a first embodiment of the present invention.

FIG. 1 is a figure showing an example of an information replay system (i.e. a display system) that includes a display control device 10 according to a first embodiment of the present invention. This information replay system includes a combination of the display control device 10, an electronic camera 20, and a display monitor 30. In the example of FIG. 1 three people, i.e. a person A, a person B, and a person C, are appreciating displayed images and replayed music with this information replay system.

The display monitor 30 includes an image display unit such as a liquid crystal display panel, a plasma display panel, a CRT, a projection type display device, or the like, and a audio replay section, and performs replay of images from an image signal supplied by the display control device 10 and replay of music or voice or the like from a audio signal supplied by the display control device 10. The electronic camera 20 may, for example, be mounted in the neighborhood of the display monitor 30, and photographs the persons A through C who are observing the display monitor 30 and transmits the photographed image to the display control device 10.

The connection between the display control device 10 and the display monitor 30, and also the connection between the display control device 10 and the electronic camera 20, may be performed by wireless connection as shown in FIG. 1, or may also be performed by cable connection using cables.

Figure 2:
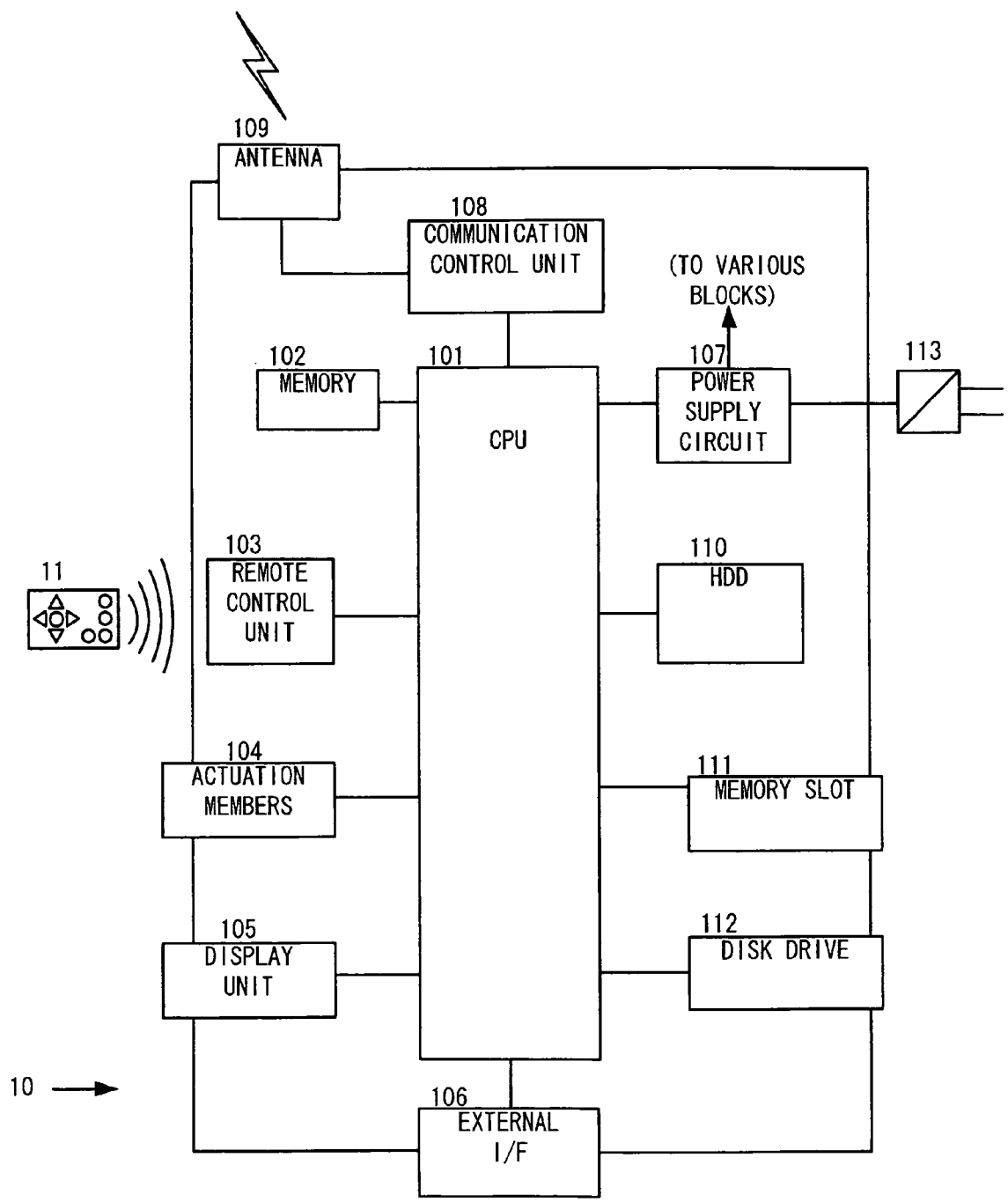
FIG. 2 is a block diagram for explanation of an example of the structure of a display control device.

FIG. 2 is a block diagram for explanation of an example of the structure of the display control device 10. This display control device 10 includes a CPU 101, a memory 102, a remote control unit 103, actuation members 104, a display unit 105, an external interface (I/F) 106, a power supply circuit 107, a communication control unit 108, an antenna 109, an HDD (Hard Disk Drive) 110, a memory slot 111, and a disk drive 112.

Based upon a control program, the CPU 101, that is a controller, performs predetermined calculations and the like using signals inputted from various sections that make up the display control device 10, and controls various sections of the display control device 10. It should be understood that this control program is stored in a non-volatile memory within the CPU 101, not shown in the figures.

The memory 102 is used as a working memory for the CPU 101. The remote control unit 103 receives signals transmitted from a remote control transmitter 11, and outputs actuation signals to the CPU 101 according to these received signals. The actuation members 104 include actuation switches and the like upon an actuation panel of the display control device 10, and send actuation signals to the CPU 101 corresponding to the switches that are actuated. The display control device 10 is adapted to be capable of being actuated by either the remote control transmitter 11 or the actuation members 104.

The display unit 105 is constituted by a LED or a liquid crystal display unit or the like, and performs display to show the operational state of the display control device 10 or the like according to command from the CPU 101. And, upon command from the CPU 101, the external interface 106 transmits and receives data to and from an external device (a computer or video player or TV tuner or the like) via a cable.

The power supply circuit 107 converts a supply of commercial power that is supplied via a power supply cable 113 into the DC power supply required within the display control device 10, and supplies the power supply after conversion to the various sections of the display control device 10. Upon command by the CPU 101, the HDD 110 can write, store, and read out data such as image data, audio data, and the like. A memory card (not shown in the figures) is fitted in the memory slot 111. This memory card includes a non-volatile memory, and, upon command by the CPU 101, can write, store, and read out data such as image data, audio data, and the like.

For example, a DVD (Digital Versatile Disk) not shown in the figures may be fitted into the disk drive 112. Upon command by the CPU 101, data such as image data or audio data or the like may be written into, stored upon, and read out from this DVD.

The communication control unit 108 includes a wireless transmission and reception circuit, and performs communication with the electronic camera 20 and with the display monitor 30 according to commands from the CPU 101. The contents of communication with the electronic camera 20 are control information for the electronic camera 20 and image data photographed by the electronic camera 20 and the like. And the contents of communication with the display monitor 30 are control information for the display monitor 30 and image signals and audio signals replayed by the display monitor 30. The antenna 109 is a transmission and reception antenna for the communication control unit 108.

Main Processing

The flow of the main processing performed by the CPU 101 of the display control device 10 will now be explained with reference to the flow chart of FIG. 3. The program that performs the processing of FIG. 3 starts when a main switch (not shown in the figures) of the display control device 10 is actuated to be turned ON, so that supply of power from the power supply circuit 107 to the CPU 101 is started.

Figure 3:
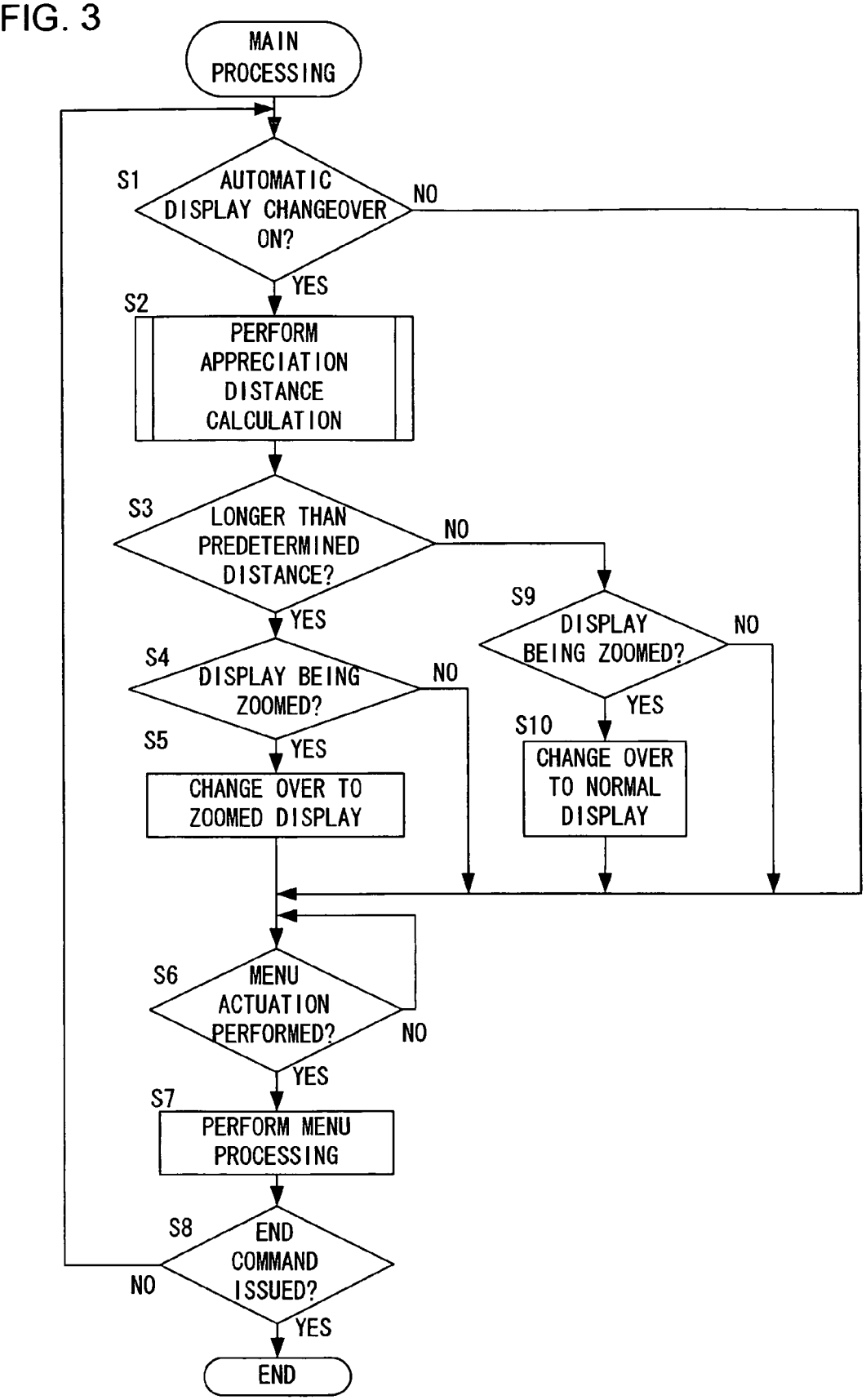
FIG. 3 is a flow chart for explanation of the flow of main processing performed by a CPU.

In a step S1 of FIG. 3, the CPU 101 decides whether or not an automatic display changeover function is set to ON. Display changeover is a function that changes over between a zoomed (magnified or enlarged) display in which display is performed with the contents displayed upon the display monitor 30 being enlarged to larger than during normal display, and a normal display in which display is performed normally without being zoomed. If setting to perform display changeover automatically is set, then the CPU 101 reaches an affirmative decision in this step S1, and the flow of control proceeds to a step S2, whereas if setting to perform display changeover automatically is not set, then the CPU 101 reaches a negative decision in this step S1, and the flow of control is transferred to a step S6. This ON/OFF setting for the automatic display changeover function is performed in advance during menu processing that will be described herein after.

In the step S2 the CPU 101 performs distance calculation processing, and then the flow of control proceeds to a step S3. The "distance" that is calculated is the distance between a user who is observing the display monitor 30 (in the case of this example, the person A~the person C) and the display monitor 30 (this will herein after be termed the "appreciation distance"). This distance calculation processing will be described in detail herein after. In the step S3, the CPU 101 decides whether or not the appreciation distance that has been acquired by the distance calculation processing is longer than a predetermined distance. If the above described appreciation distance is longer than the predetermined distance, then the CPU 101 reaches an affirmative decision in this step S3 and the flow of control proceeds to a step S4, whereas if the above described appreciation distance is less than or equal to the predetermined distance, then the CPU 101 reaches a negative decision in this step S3 and the flow of control is transferred to a step S9. The predetermined distance is determined according to the size of the effective display region of the display monitor 30 (in other words, according to the screen size). The setting of the screen size is performed in advance, during the menu processing.

In the step S4, the CPU 101 decides whether or not zoomed display is being performed. If zoomed display is being performed, then the CPU 101 reaches an affirmative decision in this step S4 and the flow of control is transferred to a step S6, whereas if zoomed display is not being performed, then the CPU 101 reaches a negative decision in this step S4 and the flow of control proceeds to a step S5. Zoomed display is a type of display in which images, characters, icons, marks and so on that are being displayed upon the display monitor 30 are displayed in magnified form, i.e. as being enlarged to larger sizes than their display sizes during normal display.

Figure 4:
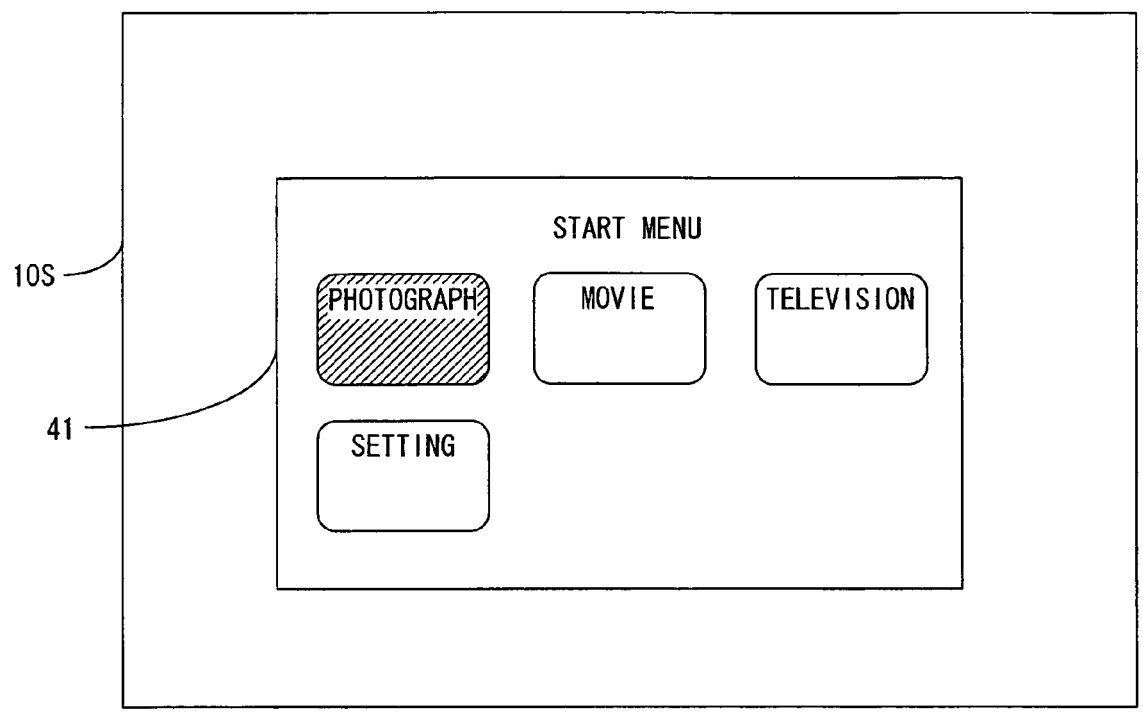
FIG. 4 is a figure showing an example of a "start menu" screen that is normally displayed upon a display monitor.

In the step S5, the CPU 101 processes the image signal to change its magnification in order to provide a zoomed display, and then transmits the signal that has been processed from the communication control unit 108 to the display monitor 30. The display of a "start menu" in this embodiment will now be explained. FIG. 4 is a figure showing an example of a "start menu" screen 41 that is being normally displayed upon the display monitor 30. Upon this "start menu" screen 41 there are included a "photograph" icon, a "movie" icon, a "television" icon for displaying replay contents, and a "setting" icon for performing function settings of the display control device 10. During normal display, the "start menu" screen 41 is displayed as overlaid in the approximate center, i.e. as overlaid over the background image that is being displayed within the display boundary 10S of the display monitor 30.

Figure 5:
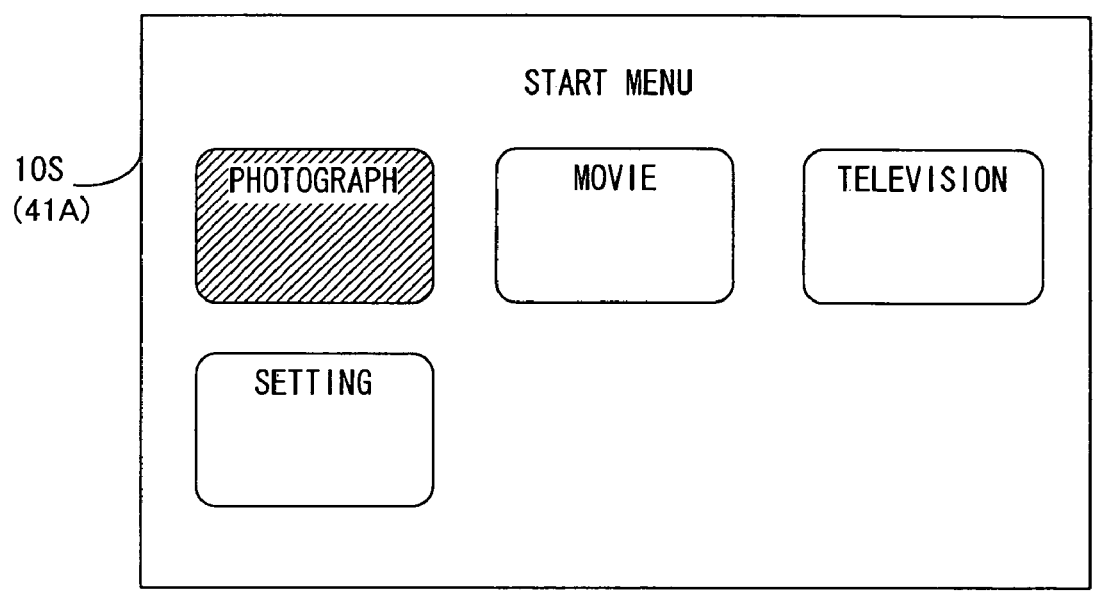
FIG. 5 is a figure showing an example of a "start menu" screen that has been changed over to a zoomed display.

FIG. 5 is a figure showing an example of a "start menu" screen 41A that has been changed over to zoomed display in the step S5 (of FIG. 3). In this zoomed display, the "start menu" screen 41A is displayed as magnified, and is of approximately the same size as the display boundary 10S of the display monitor 30.

It should be understood that, if the CPU 101 is supplying an audio signal (music or voice or the like) to the display monitor 30, then in the step S5, along with providing a zoomed display of the image, it would also be acceptable to arrange to exercise control so as to increase the volume of this audio.

In the step S9 to which control is transferred if a negative decision is reached in the step S3 of FIG. 3, the CPU 101 makes a decision as to whether or not zoomed display is being performed. If zoomed display is being performed then the CPU 101 reaches an affirmative decision in this step S9 and the flow of control proceeds to a step S10, whereas if zoomed display is not being performed then the CPU 101 reaches a negative decision in this step S9 and the flow of control is transferred to a step S6. In the step S10, the CPU 101 performs magnification change processing upon the image signal for providing a normal display, and then transmits this signal that has been processed to the display monitor 30 from the communication control unit 108. Due to this, the screen display upon the display monitor 30, that was appearing as zoomed as shown by way of example in FIG. 5, now changes over to normal display, as shown by way of example in FIG. 4. Such normal display is a type of display in which images, characters, icons, marks and soon that are being displayed upon the display monitor 30 are displayed in reduced form, i.e. as being shrunk to smaller sizes than their display sizes during zoomed display.

It should be understood that, if the CPU 101 is supplying an audio signal to the display monitor 30, and has been exerting control so as to increase the volume of this audio along with the zoomed display of the image, then, in the step S10, the volume of this audio should be returned to the original value (i.e. to normal). In other words, the audio volume should be lower than during zoomed display.

In the step S6, the CPU 101 makes a decision as to whether or not menu actuation has been performed upon the start menu that is being displayed. If an actuation signal is being inputted from the remote control unit 103 or from the actuation members 104, then the CPU 101 reaches an affirmative decision in this step S6 and the flow of control proceeds to a step S7, whereas if no such actuation signal is being inputted then the above decision processing is repeated.

Menu Processing

Menu actuation can be performed with either the remote control transmitter 11 or the actuation members 104. When an actuation signal to shift the cursor is inputted from either the remote control unit 103 or the actuation members 104, the CPU 101 generates an image signal so as to shift the cursor over the icon that corresponds to the actuation signal (for example by sloped hatching over the icon), and the signal that has thus been generated is transmitted from the communication control unit 108 to the display monitor 30. Further, when an actuation signal that means that the "OK" button has been actuated is inputted from the remote control unit 103 or the actuation members 104, then the CPU 101 selects the icon upon the screen of the display monitor 30 over which the cursor is positioned at that time point (for example, the "photograph" icon).

In the step S7 of FIG. 3, the CPU 101 performs menu processing, and then the flow of control proceeds to a step S8. An example of the menu processing will now be explained in the following. The user (in the case of this example, the person A~the person C) selects an icon, from among the icons that are being displayed upon the display monitor 30 (see FIG. 4 or FIG. 5), that corresponds to the contents that he wishes to appreciate (for example, if he wishes to appreciate a photograph, the "photograph" icon). And an actuation signal is inputted to the CPU 101, by the user using the remote control transmitter 11 or the actuation members 104.

Photograph Appreciation

Figure 6:
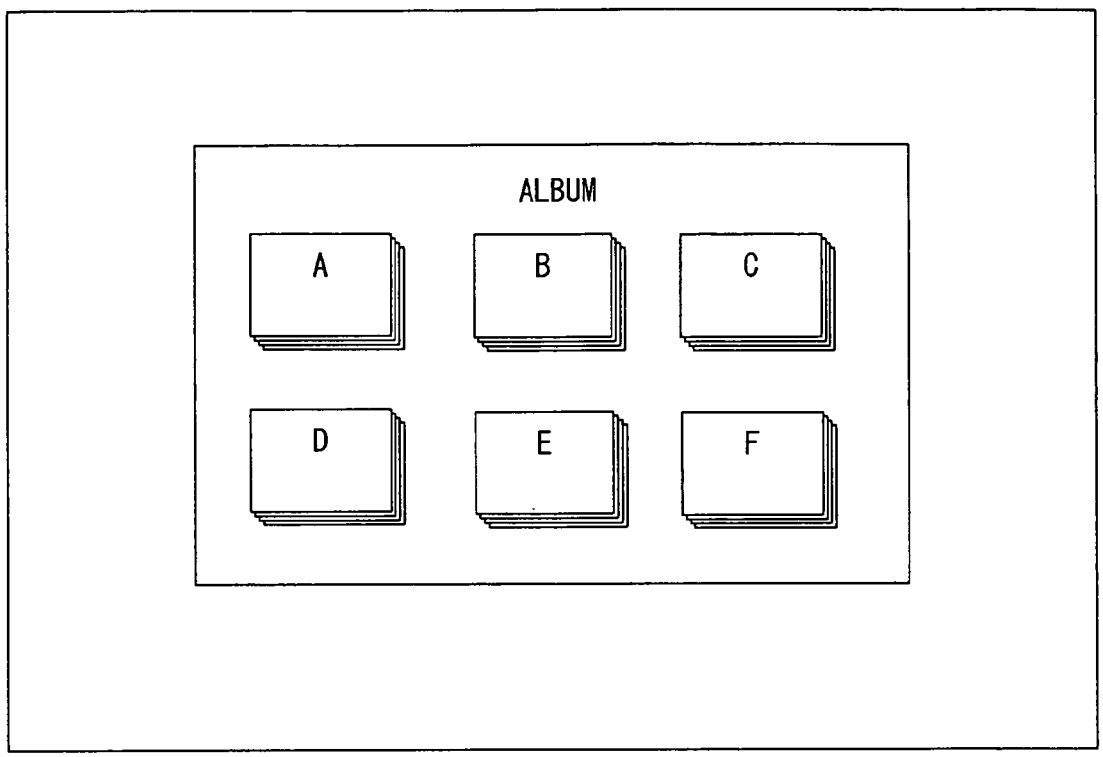
FIG. 6 is a figure showing an example of an "album" menu screen that is normally displayed upon the display monitor.
Figure 7:
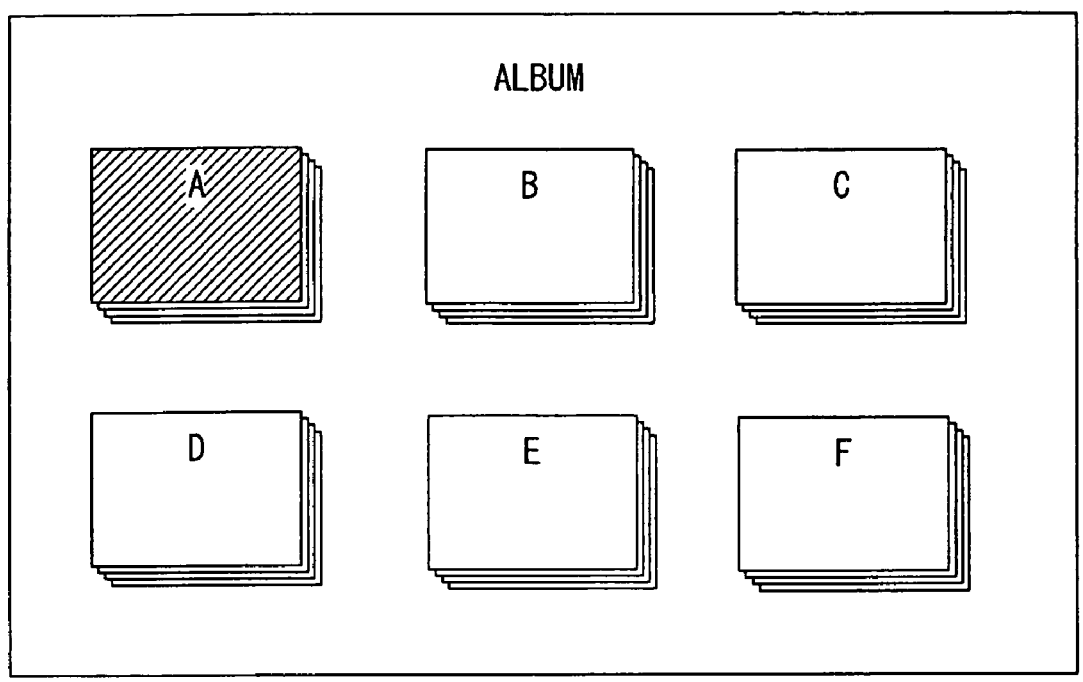
FIG. 7 is a figure showing an example of an "album" menu screen that has been changed over to a zoomed display.

Having selected the "photograph" icon, the CPU 101 generates the required image signal for displaying the "album" menu screen, and transmits this signal that has been generated to the display monitor 30 from the communication control unit 108. FIGS. 6 and 7 are both figures showing examples of the "album" menu screen that is being displayed upon the display monitor 30. FIG. 6 shows the case of a normal display, while FIG. 7 shows the case of a zoomed display. An icon for album "A", and icon for album "B" . . . an icon for album "F" are displayed upon this "album" menu screen. In the display of the album icons, it would also be acceptable to arrange to provide a display that includes representative images (thumbnails) in these albums.

Although the album icons are normally displayed by searching for album files that are stored upon the HDD 110, according to an actuation signal, it would also be possible to search from a memory card in the memory slot 111, or from a DVD in the disk drive 112.

When the "album" menu screen has been displayed upon the display monitor 30, and when an actuation signal to shift the cursor is inputted from the remote control unit 103 or the actuation members 104, the CPU 101 generates an image signal to shift the cursor over the icon that corresponds to that actuation signal, and transmits the signal that has thus been generated to the display monitor 30 from the communication control unit 108. Moreover, when an actuation signal that means that the "OK" button has been actuated is inputted from the remote control unit 103 or the actuation members 104, the CPU 101 reads out the image file that corresponds to the album icon over which the cursor is positioned upon the screen of the display monitor 30 at this time point, from the HDD 110 (or from the memory card or the DVD).

And the CPU 101 generates an image signal for replay display of the contents that have thus been read out upon the display monitor 30, and transmits the signal that has thus been generated to the display monitor 30 from the communication control unit 108. Due to this, replay of the album upon the display monitor 30 is performed. It should be understood that, if a music file is established in correspondence with the image file that is replayed, then the CPU 101 reads out that music file from the HDD 110 (or from the memory card or the DVD), generates an audio signal for audio replay of the contents that have thus been read out upon the display monitor 30, and transmits the signal that has thus been generated to the display monitor 30 from the communication control unit 108. Due to this, the music that corresponds to the image that is being replay displayed by the display monitor 30 is also replayed.

Although the case of appreciation of a photograph has been explained in the above, the same is also true in the case that, for appreciating a movie, the "movie" icon has been selected, or in the case that, for appreciating a television broadcast, the "television" icon has been selected.

If the "setting" icon has been selected in FIG. 4 or FIG. 5, the CPU 101 generates the required image signal for displaying a "setting" menu screen not shown in the figures, and transmits the signal that has thus been generated to the display monitor 30 from the communication control unit 108. The items that are set with this "setting" menu include the ON/OFF changeover of the above described "automatic display changeover function", the screen size setting for the display monitor 30, the selection commands for a distance calculation method and for an appreciation distance selection method that will be described herein after, distance data, and the like. When, for example, the "automatic display changeover function" icon has been selected, the CPU 101 performs changeover of the ON/OFF of the automatic display changeover, according to actuation signals from the remote control unit 103 or the actuation members 104.

In the step S8, the CPU 101 makes a decision as to whether or not an end command has been issued. If an actuation signal for an end command has been inputted from the remote control unit 103 or the actuation members 104, then the CPU 101 reaches an affirmative decision in this step S8, and performs predetermined power supply OFF processing and then terminates the main processing of FIG. 3. On the other hand, if no such actuation signal for an end command has been inputted, then the CPU 101 reaches a negative decision in this step S8, and the flow of control returns to the step S1.

Since the distance calculation processing (of the step S2) is performed for a second time when the flow of control returns to the step S1, accordingly, if the appreciation distance of the user who is observing the display monitor 30 changes from what it was during the distance calculation the previous time, then display changeover is performed according to this appreciation distance that has been newly calculated (in the steps S5 and S10).

Distance Calculation Processing

The CPU 101 calculates the appreciation distance using that calculation method, among the following four distance calculation methods, that is commanded in advance. The distance calculation method that is used by the CPU 101 is commanded in advance during the menu processing.

Calculation Method #1

The calculation method #1 is used when the appreciation distance between the display monitor 30 and the user is approximately equal to the distance between the electronic camera 20 and the user, as when the distance between the display monitor 30 and the electronic camera 20 is extremely small as compared with the distance between the display monitor 30 and the user. The CPU 101 calculates the appreciation distance between the user and the display monitor 30 from the distance information that is detected by the electronic camera 20. In concrete terms, a control signal that commands focus adjustment of the electronic camera 20 and a control signal that commands transmission of focus adjustment information for the electronic camera 20 to the display control device 10 are transmitted from the communication control unit 108 of the display control device 10 to the electronic camera 20. Due to this, focus adjustment information is transmitted to the display control device 10 from the electronic camera, once it has performed focus adjustment by taking the user as the main photographic subject. It should be understood that the photographic angle of view of the electronic camera 20 is adjusted in advance so that the user who is observing the display monitor 30 is included therein.

If the electronic camera 20 performs focus adjustment by a phase difference detection method, then this focus adjustment information is taken as being the defocus amount when detecting the phase difference; while, if the electronic camera 20 performs focus adjustment by a contrast detection method (a so called hill climbing method), then it is taken as position information for the focus adjustment optical system that corresponds to the properly focused position. And the CPU 101 calculates the photographic subject distance (in other words, the appreciation distance) using this focus adjustment information that it has received with the communication control unit 108. The relationship between the focus adjustment information and the photographic distance is stored in advance in a memory within the CPU 101 as function data or table data.

Calculation Method #2

The calculation method #2, also, is used when the appreciation distance between the display monitor 30 and the user is approximately equal to the distance between the electronic camera 20 and the user, as when the distance between the display monitor 30 and the electronic camera 20 is extremely small as compared with the distance between the display monitor 30 and the user. The CPU 101 calculates the appreciation distance between the user and the display monitor from the image that has been photographed by the electronic camera 20. In concrete terms, a control signal that commands photography and a control signal that commands transmission of the photographed image to the display control device 10 are transmitted from the communication control unit 108 to the electronic camera 20. Due to this, the image that has been photographed is transmitted from the electronic camera 20, that has performed this photography, to the display control device 10. In a similar manner to the case with the calculation method #1, the photographic angle of view of the electronic camera 20 is adjusted in advance, so that the user who is observing the display monitor 30 is included therein.

The CPU 101 performs face extraction upon the photographed image that it has received from the communication control unit 108. This face extraction may, for example, use the technique disclosed in Japanese Laid-Open Patent Publication H09-251534 (U.S. Pat. No. 5,982,912). The CPU 101 obtains the proportion of the area in the photographed image that is occupied by the face region, and calculates the appreciation distance using this proportion. The relationship between the proportion of the face region and the appreciation distance is stored in advance in a memory within the CPU 101 as function data or table data.

Calculation Method #3

The camera performs face recognition, measures the distance information to that face, and transmits this information to the control device 10.

Calculation Method #4

In the calculation method #4, the appreciation distance between the display monitor 30 and the user is acquired without using any information from the electronic camera 20. For example, if a sofa (not shown in the figures) is placed in front of the display monitor 30, and the user is sitting upon this sofa and observing the display monitor 30, then the appreciation distance between the display monitor 30 and the user is approximately equal to the distance between the display monitor 30 and the sofa. The CPU 101 takes the distance to the sofa, that is specified by data stored in advance in a memory within the CPU 101, as being the appreciation distance between the display monitor 30 and the user.

According to the first embodiment as explained above, the following advantageous operational effects may be obtained.

(1) This information replay system (display system) calculates the appreciation distance of viewing between the user and the display monitor, and according to the appreciation distance, changes over between a normal display in which the images, characters, icons and the like that are displayed upon the display monitor 30 are displayed at normal sizes, and a zoomed display in which they are enlarged to be bigger as compared with their sizes during normal display. By changing over to a zoomed display, the contents displayed by the display monitor 30 come to be displayed at a size that is easier to see from the point of view of the user, who is performing appreciation while separated from the display monitor 30 by further than the predetermined distance. Moreover, by changing over to the normal display, the information is not displayed at a size that is greater than required by the user, who is performing appreciation while being within the predetermined distance from the display monitor 30.

(2) Since it is arranged for it to be possible to select any one of the calculation methods #1 through #4 as the method for calculation of the appreciation distance, accordingly, if for example it is possible for the electronic camera 20 to transmit focus adjustment information (i.e. range-finding information), then the "calculation method #1" may be used; if it is possible for the electronic camera 20 to transmit the image that has been photographed, then the "calculation method #2" may be used; and if it is possible to determine the viewing position of the user but it is not possible to use the electronic camera 20, then the "calculation method #3" may be used; so that it is possible to use an appropriate calculation method according to the circumstances.

(3) Since, if the automatic display changeover function is set to be ON, it is arranged to repeat the steps S1 through S8, including, in this loop that is repeated, the calculation of the appreciation distance (in the step S2) and the changeover between zoomed display and normal display (in the steps S5 and S10), accordingly it is possible to perform changeover between the zoomed display (the step S5) and the normal display (the step S10) in real time, when the result of the decision in the step S3 relating to the appreciation distance changes.

Variant Embodiment #1

While the above described calculation method #1 and calculation method #2 have been explained on the basis that the distance between the display monitor 30 and the user (i.e. the appreciation distance) is approximately equal to the distance between the electronic camera 20 and the user, as it is when the distance between the display monitor 30 and the electronic camera 20 is extremely small as compared with the distance between the display monitor 30 and the user, the present invention can also be applied even if the distance between the display monitor 30 and the electronic camera 20 is not extremely small as compared with the distance between the display monitor 30 and the user. In this case, in this variant embodiment #1, the CPU 101 can calculate the appreciation distance with trigonometry or the like, using the distance between the electronic camera 20 and the user as calculated by the calculation method #1 or the calculation method #2, and the positional relationship between the display monitor 30 and the electronic camera 20. The positional relationship between the display monitor 30 and the electronic camera 20 is determined in advance during the menu processing, and is stored in the memory within the CPU 101.

Variant Embodiment #2

It would also be acceptable to arrange to vary the zoom magnification during zoomed display according to the appreciation distance. If the zoom magnification is made to be greater as the appreciation distance becomes longer, then it becomes easy from the point of view of the user to see the details of the display. It should be understood that this changing of the zoom magnification may be performed continuously in a stepless manner, or alternatively may be performed discretely by predetermined steps.

Variant Embodiment #3

It would also be acceptable to arrange for the flow of control to be transferred to the step S1, if a negative decision is reached in the step S6 of FIG. 3. Since, by doing this, until menu actuation is performed, the display is always changed to the optimum, accordingly it becomes easier from the point of view of the user to see the details of the display upon the display monitor 30.

FIG. 9 is a functional block diagram showing the above described variant embodiments #1 through #3 that are processed by the CPU 101.

Embodiment Two

Figure 8:
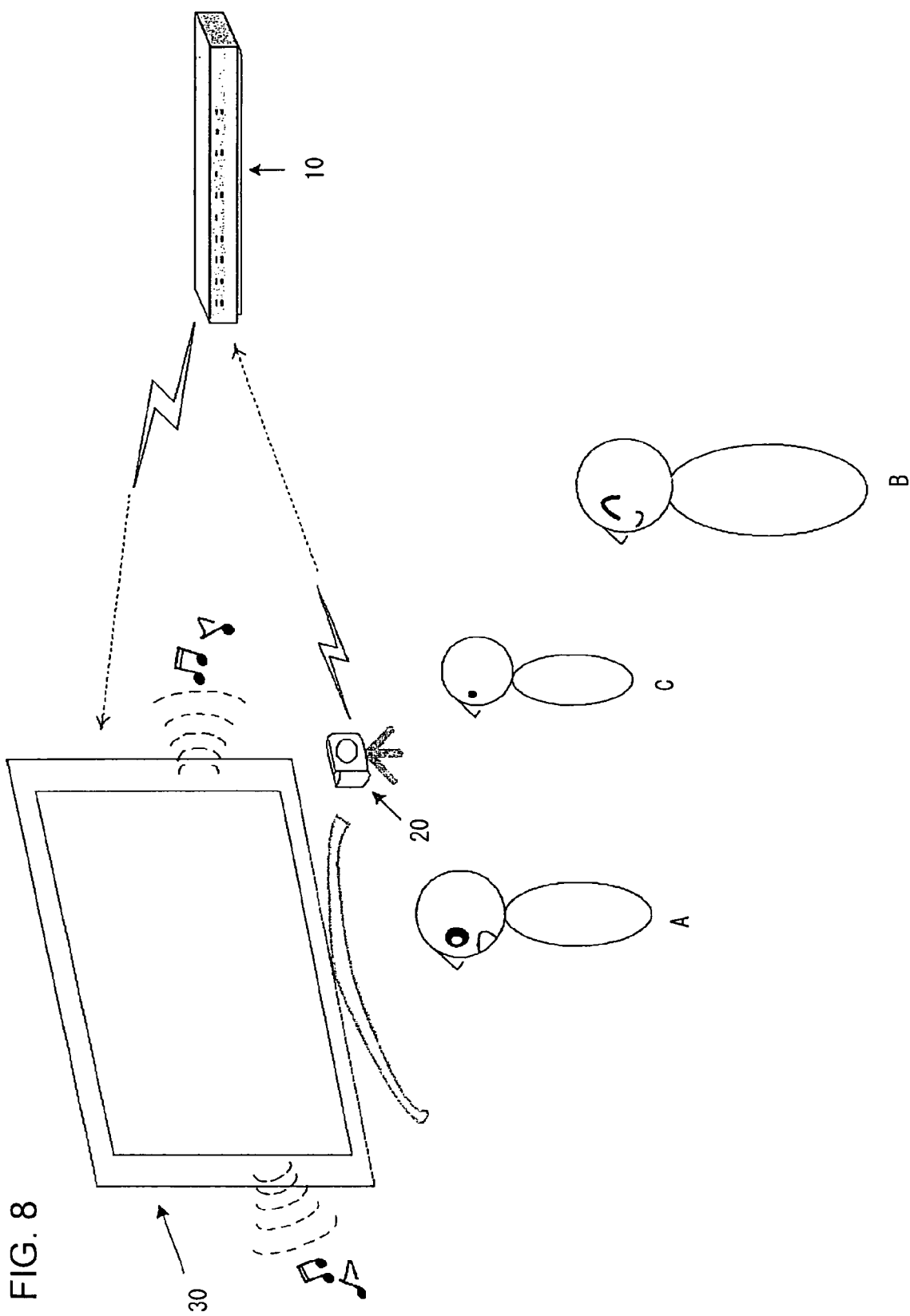
FIG. 8 is a figure showing an example of an information replay system according to a second embodiment.

FIG. 8 is a figure showing an example of an information replay system (a display system) according to a second embodiment. In a similar manner to the case with the first embodiment, the appreciation distance between the display monitor 30 and the user is approximately equal to the distance between the electronic camera 20 and the user, as it is when the distance between the display monitor 30 and the electronic camera 20 is extremely small as compared to the distance between the display monitor 30 and the user. The aspect in which FIG. 8 differs from FIG. 1, is that the appreciation distances of the three persons, i.e. the person A, the person B, and the person C, are different. The CPU 101 of this second embodiment calculates the respective appreciation distances for a plurality of users. The calculation of the appreciation distance for each of the users is performed using a calculation method, among the following three calculation methods, that is commanded in advance. Thus, the distance calculation method that is used by the CPU 101 is commanded in advance during the menu processing.

Calculation Method #5

In the calculation method #5, the photographic range is divided up into predetermined regions, and, using focus adjustment information that has been acquired for each of the divided regions, an appreciation distance is calculated for each of these divided regions. In each of the divided regions, an appreciation distance is calculated for the user who is present in which region. In this case, the CPU 101 transmits, from the communication control unit 108 of the display control device 10 to the electronic camera 20, a control signal that commands focus adjustment for each of the divided regions, and a control signal that commands the focus adjustment information for the electronic camera 20 to be transmitted to the display control device 10. Due to this, the focus adjustment information for each of the divided regions is transmitted to the display control device 10 from the electronic camera 20, that has performed focus adjustment for each of the divided regions. It should be understood that the photographic angle of view of the electronic camera 20 is adjusted in advance, so that the user who is observing the display monitor 30 is included therein.

The focus adjustment information may, if for example the electronic camera 20 performs focus adjustment by a phase difference detection method, be taken as being the defocus amount when the phase difference is detected; or, if the electronic camera 20 performs focus adjustment by a contrast detection method (i.e. a so called hill climbing method), it may be taken as being the position information of the focus adjustment optical system that corresponds to the properly focused position. And the CPU 101 calculates the photographic subject distance (in other words, the appreciation distance) for each of the divided regions, using the focus adjustment information that has been received by the communication control unit 106.

Calculation Method #6

In the calculation method #6, a plurality of face regions are extracted from the photographed image, and an appreciation distance is calculated for each of these face regions. In this case, in a similar manner to the case for the calculation method #2, the CPU 101 transmits a control signal that commands photography, and a control signal that commands transmission of the photographed image to the display control device 10, from the communication control unit 108 to the electronic camera 20. Due to this, the photographic image that has been photographed is transmitted from the electronic camera 20 to the display control device 10. It should be understood that the photographic angle of view of the electronic camera 20 is adjusted in advance so that the users who are observing the display monitor are included therein.

The CPU 101 performs face extraction upon the photographed image that has been received by the communication control unit 108. The face extraction technique is the same as in the case of the calculation method #2 described above. Further the CPU 101 obtains, for each of the plurality of face regions that have been extracted, the proportion of the area in the photographed image occupied by this face region, and calculates an appreciation distance for each of the users using these proportions.

Calculation Method #7

The camera performs face recognition, measures the distance information to each of a plurality of faces, and transmits these distances to the display control device 10.

And the CPU 101 selects one appreciation distance from the plurality of appreciation distances that correspond to the plurality of users, using a selection method, among the following three types of appreciation distance selection method, that has been commanded in advance. The appreciation distance selection method that is to be used by the CPU is commanded in advance during the menu processing.

Selection Method #1

In the selection method #1, the furthest distance is selected from among the plurality of appreciation distances.

Selection Method #2

In the selection method #2, the closest distance is selected from among the plurality of appreciation distances.

Selection Method #3

In the selection method #1, the average distance is selected from among the plurality of appreciation distances.

According to the second embodiment as explained above, the following advantageous operational effects may be obtained.

(1) Since it is arranged for it to be possible to select any one of the calculation methods #5 through #7 as the method for calculating the appreciation distance, accordingly, if for example the electronic camera 20 is capable of transmitting focus adjustment information (i.e. range-finding information), then the "calculation method #5" is used, while if the electronic camera 20 is capable of transmitting a photographed image, then the "calculation method #6" is used; in other words, it is possible to utilize which ever calculation method is most appropriate, according to the circumstances.

(2) Since the calculation methods #5 through #7 make it possible to calculate an appreciation distance for each of a plurality of users, accordingly, even if the appreciation distance of each of the users is different, it is still possible to calculate an appreciation distance for each user.

(3) Since it is arranged for it to be possible to select any one of the selection methods #1 through #3 as the selection method for the appreciation distance that is to be used in the decision of the step S3, accordingly, if for example a difference between the appreciation distances of the users is larger than a predetermined value, then the "selection method #1" may be selected; if a difference between the appreciation distances of the users is smaller than a predetermined value, then the "selection method #2" may be selected; and, if the number of users is greater than or equal to a predetermined number, then the "selection method #3" may be selected; so that it is possible to utilize which ever calculation method is most appropriate, according to the circumstances.

Embodiment Three

In the third embodiment, a plurality of face regions are extracted from the photographed image, and a person who has been registered in advance is identified using the data for these face regions that have been extracted. And, on the basis of information for the persons who have been identified, a single appreciation distance is selected from among the plurality of appreciation distances that correspond to this plurality of users.

Recognition Processing

According to the calculation method #6 or #7 described above, the CPU 101 calculates appreciation distances for each of the users who correspond to the plurality of face regions that have been extracted, and performs user recognition processing for each of this plurality of face regions that have thus been extracted. In this user recognition processing, the technique disclosed in the documents described above (Japanese Laid-Open Patent Publication H09-251534 and U.S. Pat. No. 5,982,912) may be used. The technique disclosed in the above described publications is one in which the face regions of persons are extracted from the photographed image, characteristic feature data is acquired from the face regions that have thus been extracted, and persons who are registered in advance are identified using this characteristic feature data.

The CPU 101 sends a command and an image signal to the communication control unit 108, and thereby performs replay display of the image that has been photographed by the electronic camera 20 upon the display monitor 30. And the CPU 101 acquires characteristic featured at a from the face regions that have been extracted, and performs referencing of the data that it has thus acquired with a data base. In concrete terms, it compares together a normalized image that it constructs from the characteristic feature data, and dictionary images of registrants who are registered in the data base in advance.

And if, for a face that has been extracted, some dictionary image is registered in the data base whose degree of resemblance with the above described normalized image is greater than or equal to a predetermined value, then the CPU 101 authenticates the person whose face has been extracted. On the other hand if, for a face that has been extracted, no dictionary image is registered in the data base whose degree of resemblance with the above described normalized image is greater than or equal to a predetermined value, then the CPU 101 does not authenticate the person whose face has been extracted. In the data base, apart from the dictionary images of the registrants, there is also stored data specifying the ages of the registrants and/or their visual acuities.

And the CPU 101 selects a single appreciation distance from the plurality of appreciation distances that correspond to the plurality of users, using a selection method that is commanded in advance from among the following three appreciation distance selection methods. The appreciation distance selection method that is used by the CPU 101 is commanded in advance during the menu processing.

Selection Method #4

In the selection method #4, from among the plurality of appreciation distances, that appreciation distance is selected that corresponds to the face of the person who has been authenticated. If a plurality of persons who have been authenticated are present, the furthest away of those distances is selected.

Selection Method #5

In the selection method #5, from among the plurality of appreciation distances, that appreciation distance is selected that corresponds to the face of the person who has not been authenticated. If a plurality of persons who have not been authenticated are present, the furthest away of those distances is selected.

Selection Method #6

In the selection method #6, from among the plurality of appreciation distances, that appreciation distance is selected that corresponds to the face of a person who has been authenticated, and for whom information is recorded in the data base to the effect that that person's visual acuity is the weakest.

Selection Method #7

In the selection method #7, from among the plurality of appreciation distances, that appreciation distance is selected that corresponds to the face of a person who has been authenticated, and for whom information is recorded in the data base to the effect that that person is the oldest. If a plurality of persons of the same age have been authenticated, then the appreciation distance of the one who is furthest away is selected.

According to the third embodiment as explained above, the following advantageous operational effects may be obtained.

(1) Along with this information replay device calculating the appreciation distances for a plurality of users, it is arranged for it to perform authentication of each user. Due to this, it is possible to perform different types of control, according as to whether each user is an authenticated user or not.

(2) With regard to the method for selecting the appreciation distance that is to be used in the decision of the step S3, since it is arranged for it to be possible to select any one of the selection methods #4 through #7, accordingly, for example: when performing control so as to make the display easy to see from the point of view of a user whose frequency of usage is high, such as the owner or the like of the information replay device, then the "selection method #4" may be selected; when performing control so as to make the display easy to see from the point of view of a user whose frequency of usage is low, such as a guest or the like, then the "selection method #5" may be selected; when performing control so as to make the display easy to see from the point of view of a user whose visual acuity is weak, then the "selection method #6" may be selected; and, when performing control so as to make the display easy to see from the point of view of a senior user, then the "selection method #7" may be selected; so that it is possible to utilize a selection method that is appropriate according to the circumstances.

Variant Embodiment #4

Although it was arranged for the above described changeover to zoomed display (in the step S5) and changeover to normal display (in the step S10) to be performed in real time after the step S3 that is performed on the basis of the information received from the electronic camera 20, it would also be acceptable to arrange for this to be performed at the time that the details that are being displayed upon the display monitor are changed over. In concrete terms, while the same details continue to be displayed upon the display monitor 30, both of the steps S5 and S10 are skipped so that the flow of control proceeds to the step S6, while, when the details of the display upon the display monitor 30 are updated (i.e. when the image that is being displayed changes over to some other image, when the menu that is being displayed changes over to some other menu, when the menu display ends, or when the menu display begins), then the processing of the steps S5 and S10 is performed. By performing changing over between the zoomed display and the normal display at a timing that is matched to the timing of updating of the details upon the display, it is possible to prevent a sudden change taking place in only the size of the display while the display details remain the same, so that it is possible to prevent any sense of discomfort being imparted to the user who is observing the display monitor 30.

Variant Embodiment #5

Moreover, it would also be acceptable to arrange to perform the processing of the steps S5 and S10, not only at the timing when the display details upon the display monitor 30 are changed over, but also when the amount of change of the appreciation distance exceeds some predetermined amount. Since, by doing this, it is possible to reduce the frequency of changing over between the zoomed display and the normal display, accordingly is possible further to prevent any sense of discomfort being imparted to the user who is observing the display monitor 30.

Variant Embodiment #6

It would also be acceptable to arrange to perform the above described appreciation distance calculation processing (of the step S2) at some timing that is commanded. In concrete terms, the processing of the step S2 may be performed according to an actuation signal from the remote control unit 103 or the actuation members 104 that commands calculation of the appreciation distance, and, if no such actuation signal that commands calculation of the appreciation distance is inputted from the remote control unit 103 or the actuation members 104, then the step S2 is skipped and the flow of control proceeds to the step S3. By doing this, it is possible to perform changeover between the zoomed display and the normal display at the timing desired by the user.

Variant Embodiment #7

It would also be acceptable to arrange to perform the above described appreciation distance calculation processing (of the step S2) at predetermined intervals (for example, once every three minutes). In concrete terms, the processing of the step S2 is performed according to a timer interrupt signal, while, if the timer interrupt signal is not inputted, then the step S2 is skipped and the flow of control proceeds to the step S3. By doing this, at fixed intervals, the appreciation distance is calculated, and it is possible to perform the changeover between the zoomed display and the normal display according to the result of this calculation.

FIG. 10 is a functional block diagram showing the above described variant embodiments #4 through #7 as they are processed by the CPU 101.

Variant Embodiment #8

Figure 11:
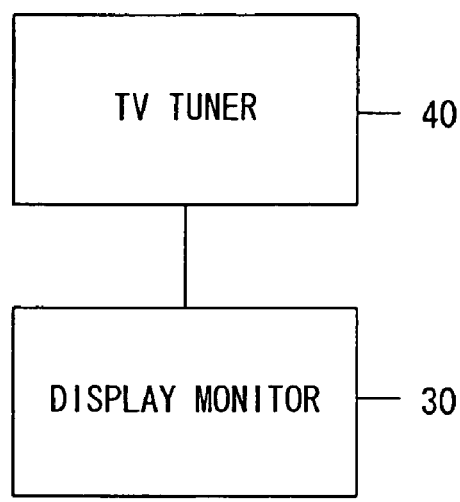
FIG. 11 is a block diagram showing a replay system that includes a television set, a replay device, and an electronic camera.
Figure 11:
Figure 11:
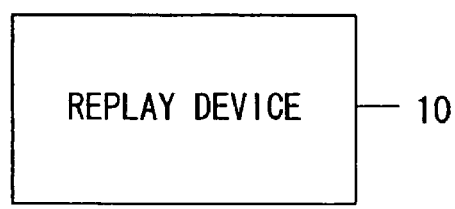
Figure 11:
Figure 11:
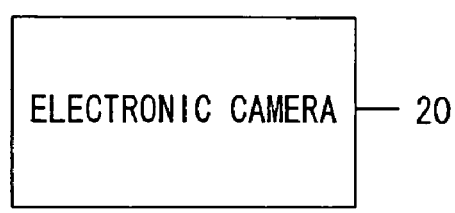

A television set 50 may be constituted by providing a TV tuner that receives TV broadcasts to the display monitor 30, so that video and audio that have been demodulated may be replayed. FIG. 11 is a block diagram showing a replay system (a display system) that is built up from this television set 50, a replay device 10, and a electronic camera 20. Moreover, it would also be acceptable for the television set 50 itself to become a replay system (a display system), by including the replay device 10. Yet further, it would also be acceptable to arrange for the electronic camera 20 also to be included within this television set 50 that is a replay system (a display system).

Variant Embodiment #9

Although an example has been explained in which an information replay system (a display system) is constituted by the combination of a display control device 10, an electronic camera 20, and a display monitor 30, it would also be acceptable to arrange for the electronic camera 20 to be housed within the display control device 10, for the electronic camera 20 to be housed within the display monitor 30, for the electronic camera 20 to be housed within a television set, for the display control device 10 and a television set to be built integrally, or for the display control device 10, the electronic camera 20, and the display monitor 30 to be all built integrally.

Variant Embodiment #10

Figure 12:
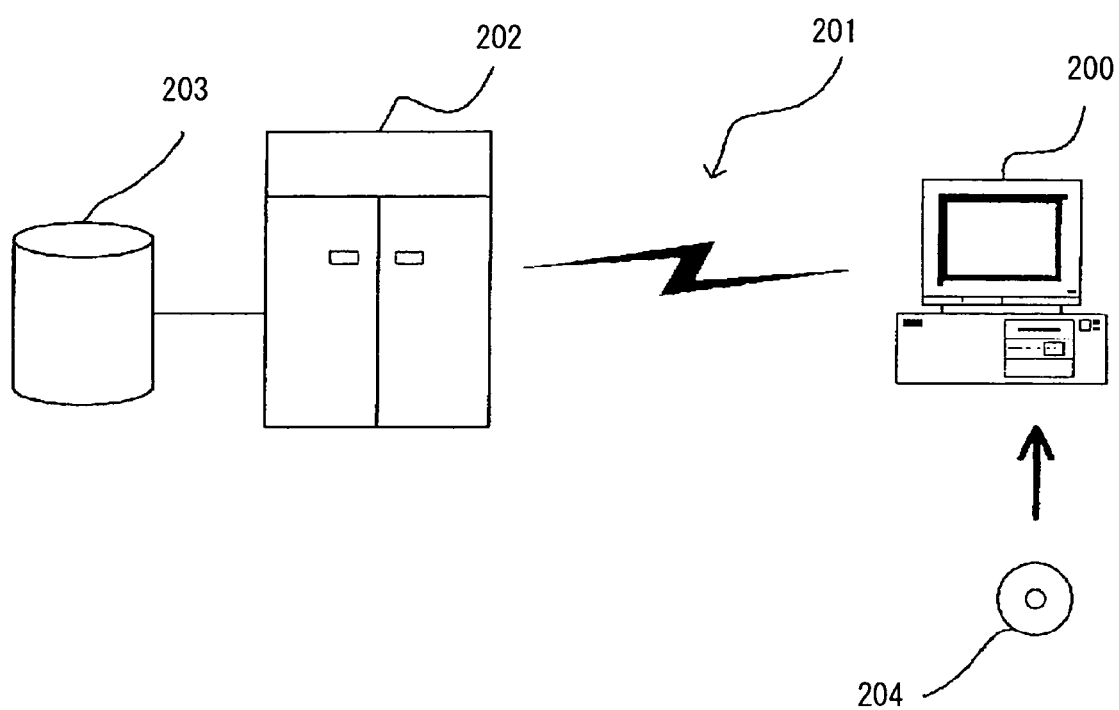
FIG. 12 is a figure showing a situation in which a program is supplied to a personal computer.

It would also be acceptable to arrange to implement the replay device 10 of the first through the third embodiments with a computer such as a personal computer or the like. In this case, the program previously described may be supplied via a recording medium such as a CD-ROM or the like, or via a data signal such as the internet or the like. FIG. 12 is a figure showing this situation. A personal computer 200 receives supply of the program via a CD-ROM 204. And the personal computer 200 is endowed with a function of connection to a communication circuit 201. A computer 202 is a server computer that supplies the above described program, and stores the program upon a recording medium such as a hard disk 203 or the like. The communication circuit 201 is a communication circuit such as the internet or the like, or a dedicated communication circuit or the like. The computer 202 reads out the program using the hard disk 203, and transmits the program via the communication circuit 201 to the personal computer 200. In other words, the program is carried upon a carrier wave as a data signal, and is transmitted via the communication circuit 201. In this manner, the program may be supplied in various different formats, such as a recording medium or a signal (a carrier wave or the like), as a computer program product that can be read in by a computer.

It should be understood that the personal computer 200 is connected to the electronic camera 20 and the display monitor 30. The display monitor 30 is a monitor or television set that is independent of the personal computer 200. However, it would also be acceptable to arrange to utilize the monitor of the personal computer 200.

The above explanation is only by way of example; the present invention is not to be considered as being limited by the structure of the embodiments described above. The first through third embodiment, and the variant embodiments #1 through #9, may be combined in any appropriate manner. Moreover, other modes are also included within the range of the present invention, provided that they are considered to fall within the scope of its technical concept.

The contents of the disclosures of the following Japanese Patent Application, upon which priority is claimed, and of the following U.S. patent, are herein incorporated by reference:

Japanese Patent Application 2006-193052 (filed on Jul. 13, 2006); and

U.S. Pat. No. 5,982,912.

The invention claimed is:

1. A display control device, comprising:
a signal supply unit that supplies an image signal to a display device to display a replay image;
a distance information obtaining unit that obtains a plurality of sets of distance information specifying a plurality of distances respectively between a plurality of persons who are observing the replay image and the replay image;
a distance selection method setting unit that sets in advance a distance selection method specifying how to select a distance from the plurality of distances;

a distance selection unit that selects a distance from the plurality of distances according to the distance selection method set by the distance selection method setting unit; and a magnification change control unit that processes the image signal so as to change a magnification of the replay image according to the distance selected by the distance selection unit.

2. A display control device according to claim 1, wherein:

the signal supply unit supplies the image signal and an audio signal to the display device that has an audio replay unit; and the display control device further comprises:

an audio control unit that changes a volume of audio replayed by the audio replay unit according to the distance selected by the distance selection unit.

3. A display control device according to claim 1, wherein the magnification change control unit performs magnification or reduction of images, characters, or marks.

4. A display control device according to claim 1, further comprising:

a reception unit that receives information from a camera that photographs a person observing the replay image, wherein the distance information obtaining unit obtains the plurality of sets of distance information based on the information received by the reception unit.

5. A display control device according to claim 4, wherein:

the information from the camera includes an image photographed by the camera;

the display control device further comprises a user recognition unit that detects face information from the photographed image that is received and performs recognition processing; and the distance selection method setting unit sets a distance selection method to select a distance between a person who is recognized by the user recognition unit, and the replay image.

6. A display control device according to claim 4, wherein:

the information from the camera includes an image photographed by the camera;

the display control device further comprises a user recognition unit that detects face information from the photographed image that is received and performs recognition processing; and the distance selection method setting unit sets a distance selection method to select a distance between a person who is not recognized by the user recognition unit, and the replay image.

7. A display control device according to claim 4, wherein the magnification change control unit processes the image signal when information is received from the camera by the reception unit.

8. A display control device according to claim 4, wherein the magnification change control unit processes the image signal at a time in which contents of the replay image change.

9. A display control device according to claim 4, wherein the magnification change control unit processes the image signal according to a command.

10. A display control device according to claim 4, wherein the magnification change control unit processes the image signal at predetermined intervals.

11. A display control device according to claim 1, wherein:

the distance selection method setting unit sets a distance selection method to select a distance that is most remote among the plurality of distances.

12. A display control device according to claim 1, wherein:

the distance selection method setting unit sets a distance selection method to select a distance that is closest among the plurality of distances.

13. A display control device according to claim 1, wherein:

the distance selection method setting unit sets a distance selection method to select an average of the plurality of distances.

14. A display system, comprising:

a display control device according to claim 1; and a display device that displays a replay image according to the image signal.

15. A television set, comprising:

a display control device according to claim 1;

a display device that displays a replay image according to the image signal; and a demodulation unit that receives a television broadcast and obtains an image signal.

16. The display control device according to claim 1, wherein the distance selection method setting unit sets in advance one of a plurality of distance selection methods, each specifying how to select a distance from the plurality of distances.

* * * * *